Jan. 16, 1968  SUSUMU TAKAO ET AL  3,363,400
PROCESS FOR REMOVING HIGHER ACETYLENES AND OTHER IMPURITIES
FROM GASES OBTAINED BY THE THERMAL CRACKING
OF HYDROCARBONS
Filed July 22, 1965

United States Patent Office 3,363,400
Patented Jan. 16, 1968

3,363,400
PROCESS FOR REMOVING HIGHER ACETYLENES AND OTHER IMPURITIES FROM GASES OBTAINED BY THE THERMAL CRACKING OF HYDROCARBONS
Susumu Takao, Chigasaki-shi, and Hiroshi Hokari, Takaoka-shi, Japan, assignors to The Japanese Geon Company, Ltd., Tokyo, Japan, a corporation of Japan
Filed July 22, 1965, Ser. No. 474,018
3 Claims. (Cl. 55—63)

The present invention relates to a process for removing higher acetylenes and other impurities from the gases obtained by the thermal cracking of hydrocarbons. More particularly, the present invention relates to an improvement of the known method of removing higher acetylenes and impurities from the gases obtained by the thermal cracking of hydrocarbons by circulating solvents through the system in the order of absorption tower, concentration tower and stripping towers (to recover solvents). Said improvement consists in carrying out the solvent recovery in two stages, namely, by the use of two stripping towers. Most of the solvent preliminarily stripped in the first stripping tower is supplied at the solvent feeding point provided at the middle section of the absorption tower. At the same time the remainder of said solvent is purified substantially completely in the second stripping tower and then conducted to the top of the absorption tower. Also where required, inert gases are introduced into each stripper at its bottom to promote the release of impurities from the solvent. The foregoing is the characteristic of the present invention.

The gases obtained by the thermal cracking of petroleum and other hydrocarbons contain relatively large amounts of useful acetylene and ethylene. In addition, there are also included various impurities (hereinafter referred to as "impurities"), for example, higher acetylenes (methyl acetylene, vinyl acetylene etc.), allenes, butadiene, benzenes and other higher hydrocarbons. These impurities are highly soluble in solvents for absorption of acetylene and ethylene. Consequently it is necessary to eliminate the impurities from the cracked gases, prior to the separation of acetylene and ethylene.

Figure 1:
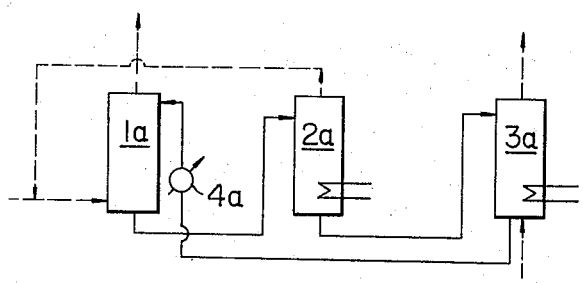

The present invention will be further described with reference to the attached diagrams. FIG. 1 is a representative example of the equipment based on the known method of removing impurities from gases by selective absorption of solvent. The equipment in FIG. 1 is designed to absorb and strip impurities from gases by circulating the solvent through absorption tower 1a, concentration tower 2a and stripping tower 3a. The entire quantity of solvent is made to flow downward from the top of absorption tower 1a to absorb the greater part of the impurities and part of other gases contained in the cracked gases introduced at the tower bottom. Thus the gases which are practically free from impurities are discharged at the tower top. The solvent discharged at the tower bottom which contains most of the impurities and part of other gases is conducted to concentration tower 2a, where the major portions of gases other than the dissolved impurities are recovered from said solvent by adjusting heating temperature and pressure in such a manner that the most impurities are not released. The recovered gases from concentration tower 2a contains entrainments of useful acetylene and ethylene. These materials are recycled to absorption tower 1a. The solvent discharged from the bottom of concentration tower 2a contains almost only impurities. Said solvent are made to run downward from the top of stripping tower 3a and impurities are removed from the solvent by heating the tower bottom. The lean solvent leaving the bottom of stripping tower 3a is cooled by cooler 4a and then recirculated to absorption tower 1a.

The object of the present invention is to improve the aforesaid method of selectively separating impurities by the aid of solvent. Further objects and advantages of the present invention will be more clearly understood from the description given below. These objects are attained by the following steps:

(1) To supply to the absorption tower bottom the gases obtained by the thermal cracking of hydrocarbons containing impurities;

(2) To bring the gases into contact with the solvent flowing downward from the middle part of the absorption tower which contains impurities at unsaturated concentrations and the solvent flowing downward from the absorption tower top which is substantially free from impurities, thereby absorbing the cracking gas impurities into said solvent;

(3) To heat the solvent which has absorbed the impurities discharged from the absorption tower bottom while said solvent is flowing downward from the concentration tower top, thereby recovering from the concentration tower top useful gases other than the impurities contained in said solvent;

(4) To heat the solvent leaving the concentration tower bottom which contains almost only impurities while said solvent is flowing downward from the top of the first stripping tower, thereby discharging most of the impurities from the first stripping tower top;

(5) To supply most of the solvent leaving the first stripping tower bottom containing impurities at unsaturated concentrations to the middle section of the aforementioned absorption tower in order to absorb further impurities;

(6) To heat the remainder of said solvent while it is flowing downward from the top of the second stripping tower, thereby discharging the impurities contained in said solvent substantially completely from the top of the second stripping tower; and (7) To supply the solvent leaving the bottom of the second stripping tower which is substantially free from impurities to the aforesaid absorption tower top in order to absorb the impurities completely.

If it is desired to reduce the content of impurities in the solvent to a minimum when impurities are stripped in the stripper, it is generally necessary to raise solvent temperature to as high a level as possible. Consequently common practice is to heat said solvent close to its boiling point. This means that considerable heat is applied to the solvent and that the solvent evaporates in substantial amounts, so that the gases leaving the tower top has to be cooled, namely, the so-called reflux operation is conducted. Thus the less impure residues are desired for the solvent, the greater is the increase in the amount of reflux required. Moreover, since said reflux must be reheated, the heat applied in the stripping tower is all the more increased.

To improve the foregoing uneconomical process, the process of the present invention is designed to discharge substantially most of the solvent from the first stripping tower bottom in which impurities remain to some extent, introduce said solvent into the absorption tower at its middle section, conduct the remainder of the solvent to the second stripping tower top for complete release of impurities, and supply the solvent thus purified to the adbsorption tower top. Since the necessity of completely stripping impurities from a large portion of solvent is eliminated in the stripping tower, saving can be made in the heat applied there. Also according to the process of the present invention, solvents having a great capacity to absorb impurities come in contact with the cracked gases around the top of tower, so that even small amounts of the solvent are sufficient to absorb a portion of the impurities because a large portion of the impurities has been absorbed below the middle section.

As clearly seen from the above-mentioned principle, it is required for the proper operation of the process of the present invention that the solvent introduced into the absorption tower at its middle section should already be sufficiently regenerated to be capable of absorbing impurities while flowing downward from the section at which it is supplied. In other words, said solvent should be in an unsaturated state in respect to the impurities.

The principal object of the first stripping process is to release such impurities as are easy to strip. The second stripping process is primarily intended to remove impurities of high solubility from the solvent which has been reduced in quantity. To promote this stripping action in the present invention, inert gas may be introduced in counter current to the down-stream of the solvent into each stripping tower, particularly into the second stripping tower at its bottom. A preferable pattern of practice is, for example, to introduce the inert stripping gas first into the second stripping tower at its bottom, discharge said gas from the top of the second stripping tower and then conduct it to the first stripping tower bottom.

According to the process of the present invention, it is possible to use towers of lesser height and diameter than those used in the previous method and completely strip high solubility impurities even with small amounts of inert stripping gas, thus reducing losses of the solvent.

Also, the stripping towers according to the present invention need not consist of two separate units. But a single tower may be divided into two parts: the upper section as the first stripping tower and the lower section as the second stripping tower.

Figure 2:
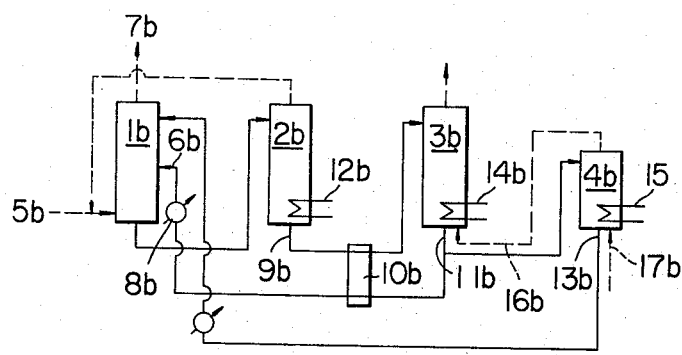

FIG. 2 diagrammatically represents a model equipment to practise the process of the present invention.

The present invention is further described with reference to an example in which the equipment in FIG. 2 is employed with kerosene as solvent.

Cracked gases consisting of carbon monoxide, hydrogen, nitrogen, carbon dioxide, acetylene, ethylene, methane and 5% by volume of higher acetylenes, allenes, butadiene and the like as impurities are pressurized to, for example, 10 atmospheres, precooled and held at said pressure. The gases are introduced into absorption tower $1b$ through gas inlet $5b$ provided at the bottom of said tower. The gases rise upward within absorption tower $1b$ are absorbed in the kerosene (containing 0.002 mol percent of impurities) supplied through feeding pont $6b$ provided at the middle section of absorption tower $1b$. Then the gases are washed with the kerosene completely stripped of impurities at the tower top. The unabsorbed gases are discharged from gas outlet $7b$. The concentration of impurities contained in the gases thus released has been reduced to 2 p.p.m. The kerosene leaving the bottom of absorption tower $1b$, which pressure has been reduced to 2.5 atmospheres, is introduced into the upper section of concentration tower $2b$.

While flowing down concentration tower $2b$, the kerosene is heated by steam pipe $12b$ provided at the tower bottom to the extent that acetylene, ethylene and other useful gases are driven out. Thus the kerosene which now contains almost only impurities is drawn out of bottom $9b$ of concentration tower $2b$ and supplied to the top of first stripping tower $3b$ through heat exchanger $10b$.

While flowing down said tower $3b$, the kerosene releases impurities by heating pipe $14b$ provided at the tower bottom and, as occasion requires, by introducing inert stripping gas $16b$ leaving the second stripping tower in order to reduce the partial pressure of impurities contained in the gas. The kerosene thus regenerated still contains 0.002 mol percent of impurities. When drawn out of the bottom of first stripping tower $3b$, most of the kerosene is introduced into heat exchanger $10b$, and, after cooled in cooler $8b$, pumped to solvent feeding point $6b$ at the middle section of absorption tower $1b$.

Part of the kerosene drawn out of the bottom of first stripping tower $3b$ is conducted to the top of second stripping tower $4b$. While flowing down said tower, the kerosene is completely stripped of impurities by heating pipe $15b$ at the tower bottom, and, depending on circumstances, by introducing gases free from impurities (inert gases for stripping purposes) into the tower bottom through $17b$. The kerosene thus regenerated which is substantially free from impurities is drawn out of the bottom of second stripping tower $4b$ and sent to the top of absorption tower $1b$.

As above described, the process of the present invention makes possible the complete removal of impurities with small amounts of heat by carrying out the stripping process (process to regenerate solvents) in two stages. Also the introduction of inert stripping gas into the stripping tower reduces heat requirements. Moreover, the impurities which have been impossible of removal by the previous method can be completely eliminated. In other words, the process of the present invention makes it possible to purify the gases leaving the absorption tower to the extent that the impurities contained therein are reduce to 2 p.p.m.

Also the process of this invention is a very effective process when applied to the case wherein at least two winds of gas component having different solubility are absorbed simultaneously. For instance, in the case of removing methyl acetylene and benzene from gases by making kerosene to absorb methyl acetylene and benzene, because the solubility of methyl acetylene in kerosene is low as compared with benzene's solubility in kerosene, in order to remove methyl acetylene completely from gases into kerosene, a large amount of kerosene is required, on the other hand because its solubility is low, its release from kerosene is relatively easy. On the other hand, because benzene's solubility in kerosene is large, an amount of kerosene required for completely absorbing benzene is small. Its release from kerosene is relatively difficult, however. Accordingly, in this invention the first stripping tower $3b$ is operated under the conditions wherein the release of methyl acetylene which is easy to release is possible, and the majority of the circulating solvent from the first stripping tower bottom $11b$ is introduced at the middle section $6b$ of the absorption tower where methyl acetylene is absorbed. The remainder of the said solvent from the first stripping tower bottom $11b$ is introduced into the second stripping tower $4b$ and operated under the condition wherein release of benzene which is difficult to release, is carried out by introducing inert gas, and the solvent from the bottom $13b$ is introduced into the tower top of the absorption tower where absorption of benzene is completely carried out.

In the conventional process using only one stripping tower, stripping tower must be operated under the conditions wherein the release of benzene in kerosene is carried out, so it costs more and requires a voluminous equipment as compared with the process of this invention.

And the process of this invention becomes more advantageous when inert stripping gas is used. Because instead of a solvent consisting of one component only which in general is expensive, a mixed solvent, consisting of a plurality of components which is comparatively inexpensive such as for instance kerosene can be used. When a multi-component solvent such as kerosene is used in the conventional process, in order to release completely gases in kerosene, the temperature of the bottom of the stripping tower must be raised to the boiling point of the component having the highest boiling point of kerosene, which is actually almost impossible. Whereas in this invention, because the driving force of release can be increased by introducing inert gas, it is unnecessary to heat to such high temperature as mentioned above.

Example 1

Gases obtained by the thermal cracking of hydrocarbons were treated by the process shown in FIG. 2 using kerosene as solvent (however, inert stripping gas from 17b was not introduced) to remove impurities from said gases. The thermally cracked gases supplied to the absorption tower had the following composition:

| | Volume percent |
|---|---|
| Impurities such as methylacetylene which have low solubility in solvent | 0.5 |
| Impurities such as benzene which have high solubility in solvent | 0.2 |
| Acetylene | 9.8 |
| Ethylene | 5.2 |
| Carbon dioxide | 24.6 |
| Carbon monoxide | 15.5 |
| Methane | 5.9 |
| Hydrogen | 37.8 |
| Nitrogen | 0.5 |

The pressures of the individual towers were controlled at the following levels:

| | Atmospheres |
|---|---|
| Absorption tower (1b) | 10 |
| Concentration tower (2b) | 2.5 |
| First stripping tower (3b) | 1.2 |
| Second stripping tower (4b) | 1.4 |

First, the cracked gases pressurized and cooled to a temperature of −20° C. were introduced into absorption tower 1b through gas inlet 5b at the rate of 100 m.³/hr. On the other hand, the kerosene containing about 0.002 mol percent of impurities (which had been drawn out of the bottom of the first stripping tower 3b and cooled to −20° C.) through inlet 6b at the middle section of absorption tower 1b at the rate of 224 kg./hr. At the same time, the kerosene completely stripped of impurities (which had been drawn out of the second stripping tower 4b and cooled to −25° C.) was supplied at the rate of 56 kg./hr. Thus impurities were selectively absorbed from the cracked gases. The concentration of impurities in the gas leaving the absorption tower top was 10 p.p.m.

It was found that while it was necessary in the previous method (FIG. 1) to heat the entire 280 kg./hr. of solvent to 90° C., it was sufficient in this example to heat all said amount of solvent to 70° C. in the first stripping tower 3b and heat a part of 56 kg./hr. of the solvent to 90° C. in the second stripping tower 4b. Thus the amount of heat required to be applied in the stripping towers was reduced to 83% of that which had been required in the previous method, and the total quantity to be refrigerated was also lessened to 86% of that which was the case in the previous method. Hence it is seen that as compared with the previous method, the process of the present invention makes it possible to separate impurities by applying less heat and also less cooling.

Example 2

Impurities were removed from the gases thermally cracked from hydrocarbons which had the same composition as in Example 1, by treating said gases in the process shown in FIG. 2 (introducing inert stripping gas). The pressures of the individual towers were controlled at the same levels as in Example 1.

The thermally cracked gases pressurized and cooled to −20° C. were introduced into absorption tower 1b through gas inlet 5b at the rate of 100 m.³/hr. On the other hand, the kerosene containing about 0.002 mol percent of impurities (which had been drawn out of the bottom of first stripping tower 3b and cooled to −20° C.) through inlet 6b at the middle section of absorption tower 1b at the rate of 192 kg./hr. At the same time the kerosene completely stripped of impurities (which had been drawn out of second stripping tower 4b and cooled to −25° C.) was introduced at the tower top at the rate of 48 kg./hr. for selective absorption of impurities from the cracked gases. Also inert stripping gas was introduced into second stripping tower 4b and first stripping tower 3b at their respective bottoms at the rate of 15 m.³/hr.

With the previous process (FIG. 1), even when as much as 20 m.³/hr. of inert gas was introduced, the gases leaving absorption tower 1a contained more than 20 p.p.m. of impurities such methylacetylene which had low solubility and more than 50 p.p.m. of high solubility impurities. However, in this example, both types of impurities contained in the gases leaving absorption tower 1b indicated only 1 p.p.m. and 2 p.p.m. respectively.

When the process in FIG. 1 was employed to remove impurities from acetylene, the remaining impurities such as methylacetylene which had low solubility still amounted to more than 200 p.p.m., and the impure residues such as benzene which had high solubility accounted for more than 500 p.p.m. However, in this example, the content of these impurities in acetylene indicated only 10 p.p.m. and 20 p.p.m., respectively.

Thus the process of the present invention has made it possible to reduce with small amount of spray gas the impurities contained in the gases leaving the absorption tower top and in the purified acetylene up to one-twentieth of those which remained unremoved with the previous method and also to minimize losses of the solvent from the stripping tower top.

Having described the specification, we claim:

1. Process for removing higher acetylenes and other impurities from the gases obtained by the thermal cracking of hydrocarbons which comprises feeding the gases obtained by the thermal cracking of hydrocarbons to the bottom of an absorption tower having top, middle and bottom sections, bringing the gases into contact with solvent flowing downwardly from the middle section of the absorption tower which contains impurities at unsaturated concentrations and then into contact with the solvent flowing downwardly from the top section of the absorption tower which is substantially free from impurities to cause the impurities to be absorbed into the solvent; feeding solvent containing absorbed impurities from the absorption tower bottom to the top of a concentration tower and heating the solvent while it flows downwardly in the concentration tower to release from the top of the concentration tower useful gases other than the impurities contained in the solvent; feeding solvent leaving the bottom of the concentration tower containing substantially only impurities to the top of a first stripping tower and heating the solvent while it flows downwardly in the first stripping tower to discharge most of the impurities from the top of the first stripping tower; feeding a major proportion of solvent leaving the first stripping tower bottom containing impurities at unsaturated concentrations to the middle section of the absorption tower in order to absorb further impurities; feeding the remainder of the solvent leaving the first stripping tower bottom to the top of a second stripping tower and heating the solvent while it flows downwardly in the second stripping tower to substantially completely discharge the impurities contained in the solvent from the top of the second stripping tower; and feeding solvent leaving the bottom of the second stripping tower which is substantially free from impurities to the top section of the absorption tower in order to absorb the impurities.

2. Process according to claim 1 wherein inert gas is introduced at the bottom of the second stripping tower while the solvent is flowing downwardly from the top of the tower.

3. Process according to claim 2 wherein inert gas is introduced at the bottom of the first stripping tower while the solvent is flowing downwardly from the top of the tower.

References Cited
UNITED STATES PATENTS 2,796,951   6/1957   Bogart _____ 55—65
2,911,067  11/1959   Bludworth et al. _____ 55—64
3,016,985   1/1962   Akin _____ 55—64
3,102,012   8/1963   Dowd _____ 55—48

SAMIH N. ZAHARNA, *Primary Examiner.*
REUBEN FRIEDMAN, *Examiner.*
C. N. HART, *Assistant Examiner.*